Dec. 22, 1959    J. BENOIT    2,918,137
FILTERS

Filed June 27, 1957    3 Sheets-Sheet 1

INVENTOR
Josef Benoit
BY Michael S. Striker
Attorney

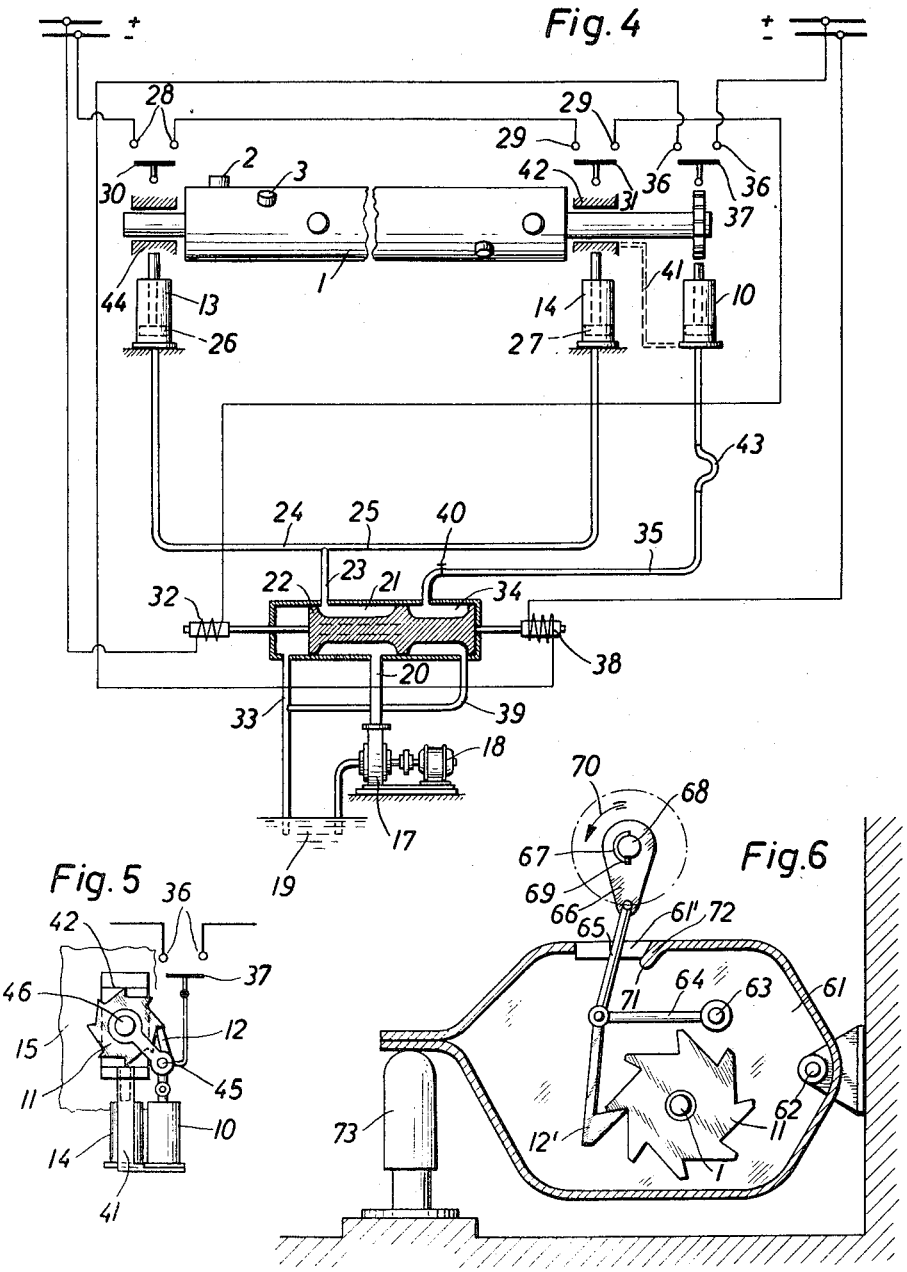

Dec. 22, 1959   J. BENOIT   2,918,137
FILTERS

Filed June 27, 1957   3 Sheets-Sheet 3

INVENTOR
Josef Benoit
BY
Michael S. Striker
Attorney

United States Patent Office 2,918,137
Patented Dec. 22, 1959

2,918,137

FILTERS

Josef Benoit, Koln-Sulz, Germany, assignor to Walther & Cie Aktiengesellschaft, Koln-Dellbruck, Germany Application June 27, 1957, Serial No. 668,517

Claims priority, application Germany June 28, 1956

9 Claims. (Cl. 183—7)

The present invention relates to filters.

More particularly, the present invention relates to that type of filter wherein dust and the like is removed from a gas by a charged electrode.

With a filter apparatus of this type certain difficulties arise in the operation of moving parts. Such moving parts when they are located at a position where they are in an atmosphere which includes the dust or the like filtered by the apparatus are subject to extremely rapid wear. Thus, bearings or other parts which include elements in frictional engagement with each other will wear very rapidly because of the dust which is in the atmosphere. It should be noted, however, that even if parts such as bearings or the like are located away from an atmosphere which includes the dust which is filtered, undesirable wear of the parts will still take place because of the dust in the atmosphere adjacent the place where dust is being filtered from a gas or the like. Moreover, with an arrangement of this latter type a considerable amount of expense is involved in passing shafts and the like fluidtightly through walls of a fluid guide, for example, so that both from a technical and an economic standpoint it is preferable to locate the moving parts within the filter casing, for example.

One of the objects of the present invention is to provide an arrangement of the above type wherein moving elements which raise and lower the electrodes to remove dust therefrom are located within the casing of the filter apparatus and still are not subject to extremely rapid wear as a result of frictionally engaging parts located in a dust-laden atmosphere.

Another object of the present invention is to provide an arrangement of the above type capable of raising the dust-carrying electrodes with a structure which does not have any parts exposed to the dust-laden atmosphere and frictionally rubbing against each other. In other words, the parts which are exposed to the dust operate without friction.

A further object of the present invention is to provide an apparatus capable of accomplishing the above objects and composed of simple and ruggedly constructed elements which are very reliable in operation.

With the above objects in view the present invention mainly consists of a filter apparatus which includes a fluid guide which guides a fluid such as a gas or the like carrying dust or the like which is to be filtered therefrom. An electrode extends into the fluid guide to have the dust or the like deposited thereon, and beneath this electrode is located a means for raising the electrode to permit it to descend so as to have the dust removed therefrom, this means for lifting the electrode having its outer portions operating without any friction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a diagrammatic illustration of an electrical and hydraulic system for automatically operating the structure of the invention;

Figure 7A:
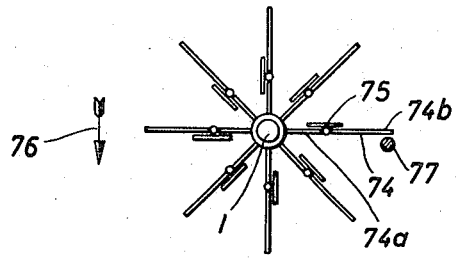
Figure 7B:
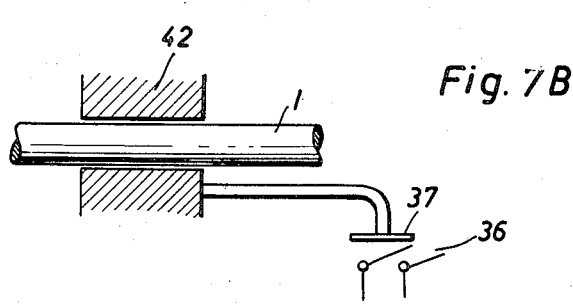
Figure 7C:
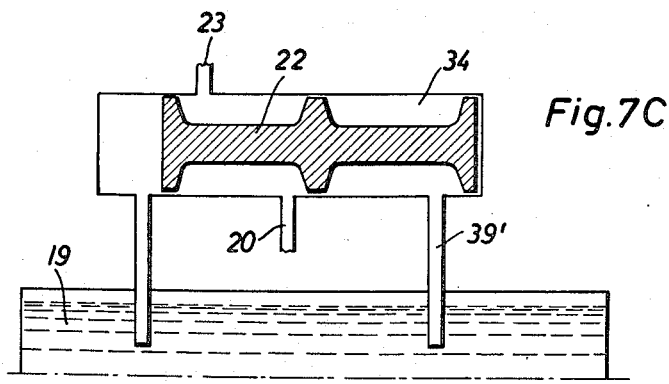

Fig. 5 diagrammatically illustrates a turning means of the invention and its association with the electrical and hydraulic structure of Fig. 4;

Fig. 6 is a longitudinal sectional partly diagrammatic view of a purely mechanical structure for raising and lowering a shaft as well as turning the same;

Fig. 7A shows a different embodiment of a structure for turning a shaft in a stepwise manner;

Fig. 7B shows a modification of the structure of Fig. 4 when the latter is modified to include the structure of Fig. 7A; and Fig. 7C shows a modification of the valve of Fig. 4 when the latter is modified to include the structure of Fig. 7A.

Figures 1, 2, 3:
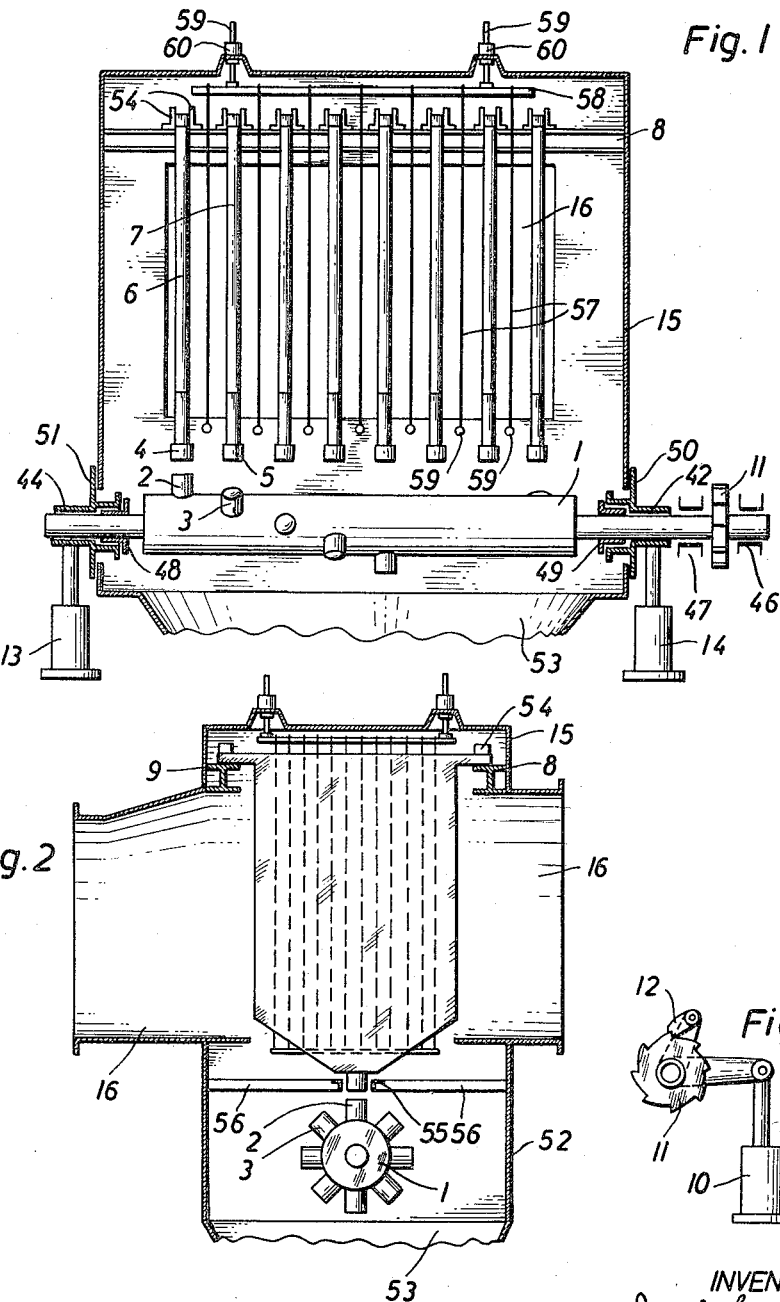
Fig. 1 is a fragmentary, transverse, sectional view of a filter apparatus according to the present invention.
Fig. 2 is a longitudinal, sectional view of a filter apparatus according to the present invention.
Fig. 3 is a schematic illustration of a structure for turning a shaft of the invention in stepwise fashion.

Referring now to the drawings, it will be seen that a fluid guide 16 (Fig. 2) forms part of a casing 15 (Fig. 1) of the entire filter apparatus, a gas which carries dust or the like moving to the right, as viewed in Fig. 2, through the fluid guide 16, as shown by the arrow at the left of Fig. 2.

A plurality of electrodes 6, 7, etc., are arranged in side by side relation within the casing 15 in a position extending downwardly through the fluid guide 16, and the structure includes the horizontal beams 8 and 9 of Fig. 2 which extend beneath the projections shown in Fig. 2 at the top of each electrode, so that the downward movement of the electrodes is limited by the beams 8 and 9. However, the electrodes are free to move upwardly to a predetermined extent, which may be from 1 to 1½ inches, for example.

The electrodes 6, 7, etc., respectively include at their bottom ends downwardly extending projections 4, 5, etc.

Beneath the portion of casing 15 which includes the fluid guide 16, this casing 15 has a housing portion 52 which houses a shaft 1 which extends at its opposite ends to the exterior of the casing 15 through suitable fluidtight sealing glands 48 and 49 diagrammatically illustrated in Fig. 1. Moreover, the plate portions 50 and 51 of the casing 15 which support the ends of the shaft 1 are capable of sliding up and down with respect to the remainder of the casing 15 while maintaining the interior of the casing closed off from the exterior thereof.

The shaft 1 at its portion within the interior of the casing 15 carries a plurality of projections 2, 3, etc., respectively, in the same planes as the several electrodes, and these projections of the shaft 1 are distributed about the axis thereof in such a way that when the shaft 1 is turned in stepwise fashion through a predetermined angle the several projections of the shaft 1 will successively assume upwardly directed positions respectively located beneath the projections of the electrodes.

In the illustrated example there are eight electrodes and eight projections on the shaft 1, this shaft 1 is turned at each step through an eighth of a revolution. Thus, in the position of the parts shown in the drawings the projection 2 is located in an operating position beneath the projection 4, and at the next turn of the shaft 1 the projection 3 will be located directly beneath the projection 5.

The right end of the shaft 1 carries a ratchet 11, as viewed in Fig. 1, and as is shown in Fig. 3 the ratchet 11 cooperates with a pawl 12 carried by a bell crank which is turned by a hydraulic mechanism 10 so that during each stroke of the mechanism 10 the ratchet 11 is turned through a distance of one tooth, and inasmuch as the ratchet 11 has eight teeth the shaft 1 is turned through an eighth of a revolution at each stroke of the hydraulic mechanism 10. The ratchet 11 is fixed directly on the shaft 1 at the exterior of the casing 15, while the bell crank which carries the pawl 12 is freely turnable on the shaft 1. Shaft 1 is turnable in bearings 42 and 44 which move with plates 50 and 51 in cut-outs of casing 15 which are covered by plates 50 and 51, and the mechanism 10 is carried by bearing 42 for vertical movement with shaft 1.

The latter structure constitutes a means for turning the shaft 1 in stepwise fashion, and in addition the structure of the invention includes a means for lifting and lowering the shaft 1, and this latter means includes a pair of hydraulic mechanisms 13 and 14 shown diagrammatically in Fig. 1 for raising and lowering the shaft 1 during each stroke of the mechanisms 13 and 14. These two mechanisms operate in synchronism with each other, and the entire apparatus is timed so that after the shaft 1 is turned through an eighth of a revolution by the hydraulic means 10 the lifting means 13 and 14 is actuated to raise and lower the shaft 1, and after such raising and lowering the mechanism 10 again operates. In this way the shaft 1 is successively turned through an eighth of a revolution and then raised and lowered, and so on.

At each raising of the shaft 1 one of the projections thereof will engage a projection of one of the electrodes to raise the latter, and then during the subsequent lowering of the shaft 1 the electrode descends until its upper extensions engage the bars 8 and 9 so as to be jarred and thus cause the dust on the electrode to fall therefrom.

It will not be noted that the shaft 1 is located out of the stream moving through the guide 16.

Also, it will be noted that during turning of the shaft 1 none of the projections thereof within the casing 15 rub against any other elements. After the shaft 1 stops turning the shaft 1 is raised and the cooperation between the projections of the shaft with the projections of the electrodes takes place without any turning of the shaft 1 so that there is absolutely no frictional rubbing of the parts with respect to each other, and in this way undesirable wear is eliminated.

Referring to Fig. 4, which diagrammatically illustrates one possible structure for raising and turning the shaft 1, it will be seen that a pump 17 is provided, this pump being continuously driven by the motor 18, and the output of the pump 17 is preferably adjustable in a stepless manner. The pump sucks a suitable fluid such as oil, for example, from the reservoir 19 along a suitable conduit to the pump and the pump discharges the liquid at a pressure of approximately 25 atmospheres along the discharge conduit 20 to a valve means which includes a shiftable valve member 22, the liquid under pressure discharging in the position of valve member 22 shown in Fig. 4 into the annular elongated cutout 21 of the valve member.

In the position of the parts shown in Fig. 4, the annular chamber 21 communicates through the conduits 23, 24 and 25 with the pair of hydraulic cylinders 13 and 14 which together with the pistons 26 and 27 respectively located therein form a hydraulic means for raising and lowering shaft 1. The cylinders 13 and 14 are fixedly carried by the frame of the filter apparatus.

The oil under pressure enters into the cylinders 13 and 14 to raise the pistons 26 and 27 respectively located therein, and the piston rods of these pistons in turn raise the bearings 44 and 42, respectively, which turnably support the shaft 1. These bearings respectively carry the electrical contact members 30 and 31 which respectively bridge the contacts of the switch 28 and the switch 29. After the shaft 1 has been raised to a predetermined extent, the latter switches are closed by elements 30 and 31, and as a result the solenoid 32 is energized, as is apparent from Fig. 4. The armature of this solenoid extends fluidtightly through the left end wall of the valve housing, as viewed in Fig. 4, and this armature is coaxial with and fixed to the valve member 22. When the solenoid 32 is energized its armature is pulled to the left, as viewed in Fig. 4, so that the valve member 22 is shifted to the left, and in this position of the valve member the liquid of the cylinders 13 and 14 is placed at a low, return flow pressure so that the liquid returns through the conduits 24, 25 and 23, through the chamber 21, and through conduit 33 back to the reservoir 19. At this time the pressure discharge conduit 20 communicates through the annular cutout 34 of the valve member 22 with the conduit 35 which leads to the cylinder 10. The oil under pressure in the cylinder 10 actuates a piston thereof to turn the toothed wheel 11 so as to turn the shaft 1 through the desired fraction of a revolution, and at the end of such turning of the shaft 1 a contact member 37 engages the contacts of switch 36 to close the latter switch so as to energize the solenoid 38. The armature of this latter solenoid is connected to the valve member 22 at the right of the latter, as viewed in Fig. 4, so that the energizing of the solenoid 38 causes the valve member 22 to be shifted back to the position shown in Fig. 4, and the oil in the cylinder 10 and conduit 35 is now placed at a low, return-flow pressure and this oil flows back through the conduit 35, the annular chamber 34, and conduits 39 and 33 to the reservoir 19. The cross sectional sides of the conduits 24, 25, 23 and 33 is such that the emptying of the cylinders 13 and 14 takes place quickly in a sudden, pulse-like fashion. On the other hand, a throttling means 40 is located in the conduit 35 for retarding the flow of liquid therethrough so that the turning of the shaft 1 does not take place until the shaft 1 has been lowered and one of the electrodes has descended to its lowermost position.

Figs. 4 and 5 show diagrammatically a bracket 41 fixed to the bearing 42 and carrying the cylinder 10 so that the latter moves up and down with the shaft 1. A portion of the conduit 35 is in the form of a flexible hose 43 capable of withstanding high pressure, so that the cylinder 10 can be moved up and down.

As is apparent from Fig. 5 the bearing blocks 42 and 44 of the shaft 1 are movable up and down in openings formed in side walls of the casing 15, respectively, and a bifurcated lever 45 turnably supports the pawl 12 which turns the toothed wheel 11. The lever 45 terminates at one end in bearing portions 46, 47 (Fig. 1) respectively located on opposite sides of the ratchet 11 and freely turnable with respect to the shaft 1. The opposite end of the lever 45 is turnably connected to a piston rod of the piston in cylinder 10 and turnably supports the pawl 12. Also, this part of the lever 45 carries the contact member 37 which closes the switch 36 after the pawl 12 has turned the wheel 11 through an angle equal to the angular distance between a pair of adjacent projections 2, 3, etc.

The stuffing boxes 48 and 49 prevent dust from having access to the bearing surfaces of bearings 42 and 44, and the plates 50 and 51 (Fig. 1) shut off the interior of casing 15 from the outside.

The shaft 1 is located beneath the stream of gas flowing through the conduit 16, and the housing portion 52 of casing 15 in which the shaft 1 is located communicates at its lower end with a funnel-shaped hopper 53 in which the dust falling from the electrodes is collected and from which the dust is removed in any suitable way. The dust which settles on the shaft 1 periodically falls from the same as a result of the periodic turning thereof into the hopper 53 without being carried away in the gas flowing through the conduit 16. Angle members 54 extend across and are carried by the beams 8 and 9 (Figs. 1 and 2), for guiding the electrodes in their up and down movement, and similar angle members 55 carried by bars 56 cooperate with the lower ends of the electrodes for guiding the same, the bars 56 in turn being carried by the casing 15.

As is known in the art, corona discharge electrodes in the form of wires 57 or the like are located between each pair of electrodes 6, 7, etc., and these wires are connected at their top ends to tubes 58 and at their bottom ends to tubes 59. The upper tubes 58 are carried by folders 59 which extend through insulated guides 60 carried by the casing 15 to a source of high voltage.

A suitable unillustrated shock absorbing means may be provided to cooperate with the shaft 1, at the bearings 42 and 44, for example, for damping the downward movement of the shaft 1 at the end of the downward movement thereof.

A means composed entirely of mechanical elements may be provided in accordance with the present invention for raising and lowering the shaft 1 as well as for turning the same after each raising and lowering cycle through a predetermined fraction of a revolution, and such a means is illustrated in Fig. 6. Fig. 6 shows the shaft 1 carrying the toothed wheel 11 which is fixed to the shaft 1. In the embodiment of Fig. 6 a free end of the shaft 1 is turnably supported in a frame 61 in the form of a hollow housing in which the wheel 11 is located and having an opening 61' formed in its top wall. The frame 61 is supported by a stationary pivot pin 62 for turning movement about a horizontal axis. The bearings 42 and 44 have sufficient clearance in the openings of the casing 15 to permit free turning of the shaft 1 with the frame 61 through a relatively small angle about the pivot pin 62. The frame 61 fixedly carries a pivot pin 63 which turnably supports a lever 64 which in turn pivotally supports a pawl 12' which hangs freely from the lever 64, as viewed in Fig. 6. This pawl cooperates with the toothed wheel 11. A connecting rod 65 is pivotally connected at its lower end to the left end of the lever 64 and extends upwardly through the opening 61' of frame 61 to a crank 66 to which the top end of the connecting rod 65 is pivotally connected in the manner shown in Fig. 6. The crank 66 is formed with an opening having a circular portion and an arcuate portion 67 extending along the periphery of the circular portion of the opening. A drive shaft 68 which is parallel to the shaft 1 has the same cross sectional size as the circular opening portion of the opening of the crank 66 and extends through this circular opening portion and is freely turnable with respect to the crank 66. The drive shaft 68 which is continuously rotated in a counterclockwise direction, as viewed in Fig. 6, for example, fixedly carries a key member 69 located in the arcuate opening portion 67 and being freely turnable therein so as to abut against either end of this arcuate opening portion.

In the position of the parts shown in Fig. 6 the key member 69 engages the crank 66 at an end of the arcuate opening portion 67 and is turning the crank in the direction of arrow 70 so as to raise the connecting rod 65. The lever 64 is thus turning about pivot 63 in a clockwise direction, as viewed in Fig. 6, at this time, and the pawl 12' is moving upwardly and is turning the wheel 11 together with the shaft 1 in a clockwise direction, as viewed in Fig. 6, to locate the next projection of the shaft 1 in an upwardly directed position.

After the parts have moved slightly beyond the position shown in Fig. 6, the pawl 12' has moved out of engagement with the wheel 11 and the lever 64 moves into engagement with a downwardly directed face 71 of a downwardly extending projection 72 located within the frame 61 and fixed to the underside of the top wall thereof. Thus, during the continued turning of the crank 66 the entire frame 61 is turned in a clockwise direction about the pivot pin 62 so as to raise the shaft 1 and at this time one of the electrodes is raised.

When the crank 66 has reached its top dead center position the key member 69 extends straight up, and upon moving slightly beyond this top dead center position the crank falls by gravity together with the elements connected thereto until the opposite end of the arcuate cutout portion 67 engages the key member 69, and in this way the shaft 1 is suddenly lowered. The electrode previously raised is also lowered until it is stopped and jarred by the beams 8 and 9 thus shaking the dust off the electrode. During the continued turning of the drive shaft 68 the above operations are repeated. In the actual construction a pair of devices as shown in Fig. 6 are respectively connected to the ends of the shaft 1 which extend beyond the casing 15, and the drive shaft 68 extends across the top of the casing 15 with the connecting rods 65 extending downwardly along opposite sides of the casing 15, respectively.

As is shown in Fig. 6, a conventional shock-absorber means 73 cooperates with the frame 61 for damping the downward movement thereof at the end of the downward movement of the shaft 1.

According to the embodiment of the invention which is shown in Fig. 7A, the toothed means carried by the shaft 1 is in the form of a plurality of bar means 74 fixed to and extending radially from the shaft 1 in the manner indicated in Fig. 7A. Each of these bar means is composed of a pair of bar portions 74a and 74b hingedly connected together by a spring hinge means 75 which urges the bar member 74b to the position shown in Fig. 7A. This bar member 74b is prevented by the hinge means 75 from moving further with respect to bar member 74a in a counterclockwise direction but can move yieldably against the force of the spring of the hinge means in a clockwise direction with respect to bar member 74a, as viewed in Fig. 7A. Thus, during downward movement of the shaft 1, as indicated by the arrow 76, a stationary pin 77 will engage one of the bars 74 to turn the shaft 1 in a counterclockwise direction through an eighth of a revolution so as to locate the next bar means 74 in the position of the right horizontal bar means 74 of Fig. 7A. During subsequent upward movement of the shaft 1 the bar 74b of the next bar means beneath the right horizontal bar means of Fig. 7A will engage the underside of the stationary pin 77 and will turn with respect to its cooperating bar 74a in a clockwise direction against the relatively weak spring force of the spring hinge so that in this way the structure rises upwardly past the pin 77 without turning the shaft 1, and of course during the next downward movement of the shaft 1 it will again be turned through an eighth of a revolution with the structure illustrated in Fig. 7A.

The pin 77 is fairly robust and is rigidly supported so that it is capable of withstanding the stresses which arise during turning of the shaft 1 while it moves downwardly with respect to the stationary pin 77. In an actual construction, the structure of Fig. 7A would be located at both of the ends of the shaft 1 which extend beyond the casing 15 so that the load is carried by both ends of the shaft 1 and by a pair of pins 77.

Of course, when the embodiment of Fig. 7A is incorporated into an electro-hydraulic timing and moving system as shown in Fig. 4, the cylinder 10 and all of the parts cooperating therewith are eliminated because the function produced by these elements is now produced by the structure of Fig. 7A. Thus, as is shown diagrammatically in Fig. 7B the contact member 37 is connected to the bearing 42 for movement therewith and the switch 36 is positioned so as to be closed by contact 37 at the end of the downward movement of the shaft 1 in order to energize the solenoid 38 so as to start the upward movement of the shaft 1.

Also, as is shown in Fig. 7C the conduit 39' which corresponds to the conduit 39 of Fig. 4 communicates directly with the reservoir 19 and is positioned nearer to the pump discharge conduit 20. The valve member 22 of Fig. 7C is identical with that of Fig. 4 and is connected in the same way to the solenoids 32 and 38. In the position of the valve shown in Fig. 7C hydraulic fluid under pressure will be delivered to the cylinders 13 and 14 for raising the shaft 1. At the end of the raising of shaft 1 the solenoid 32 is energized in the manner described above in connection with Fig. 4 so as to shift the valve member 22 to its left end position, as viewed in Fig. 7C, and in this position the liquid pumped by the pump 17 moves from the chamber 34 directly back to the reservoir 19 through the conduit 39'.

Except for the above differences shown in Figs. 7B and 7C the structure of Fig. 7A can replace the structure of Fig. 4 for turning the shaft 1 and can cooperate properly with the rest of the structure of Fig. 4.

It will be understood that each of the elements described above, or two or more together, may also find a useful application in other types of filter differing from the types described above.

With the above the invention has been illustrated and described as embodied in electro-filter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a filter apparatus, in combination, fluid guiding means for guiding a fluid carrying dust and the like; an elongated electrode extending into said fluid guiding means for removing from a fluid dust which deposits itself upon the electrode said electrode being movable in longitudinal direction thereof between an upper and a lower position; means limiting the downward movement of said electrode while freeing the same for upward movement; a shaft located beneath said electrode and having a projection spaced from said electrode; turning means operatively connected to said shaft for turning the projection thereof to a position directed toward said electrode without engaging said electrode during the turning movement; and lifting means operatively connected to said shaft for raising the same when said projection is in said position thereof in said longitudinal direction and for then lowering said shaft, whereby when the shaft is raised the projection thereof will engage and raise the electrode so that upon subsequent lowering the electrode will be jarred by said limiting means and the dust and the like will fall from the electrode and whereby said projection will not move relative to said electrode after engagement with the latter so that friction and wear resulting therefrom is avoided during the movement of said electrode by said projection.

2. In a filter apparatus, in combination, a fluid guide for guiding a fluid which carries dust or the like; a plurality of elongated electrodes located in side by side relation and extending into said fluid guide for removing dust or the like from a fluid passing through the fluid guide, each of said electrodes being movable in longitudinal direction thereof between an upper and a lower position; means limiting the downward movement of said electrodes while freeing the same for upward movement; a shaft extending beneath said electrodes; a plurality of projections carried by said shaft, respectively distributed about the axis thereof, and respectively aligned with and spaced from said electrodes; turning means operatively connected to said shaft for turning the same in stepwise fashion to successively place the projections of said shaft in positions extending upwardly toward said electrodes, respectively without engaging said electrodes during the turning movement; and means cooperating with said shaft for raising and lowering the same in said longitudinal direction after each projection is located in said position thereof, whereby the electrodes will be successively engaged and raised by said projections during the raising of said shaft so that during the lowering of the shaft the electrodes will be jarred by said limiting means to have the dust or the like removed therefrom and whereby said projections will respectively not move relative to the electrode thereby so that friction and wear resulting therefrom is avoided during movement of said electrodes by said projections.

3. In an apparatus as recited in claim 2, said electrodes respectively including bottom projections which are directed downwardly and respectively aligned successively with the projections of said shaft.

4. In a filter apparatus, in combination, a fluid guide for guiding a fluid which carries dust or the like; a plurality of elongated electrodes located in side by side relation and extending into said fluid guide, each of said electrodes being movable in longitudinal direction thereof between an upper and a lower position for removing dust or the like from a fluid passing through the fluid guide; means limiting the downward movement of said electrodes while freeing the same for upward movement; a shaft extending beneath said electrodes; a plurality of projections carried by said shaft, respectively distributed about the axis thereof, and respectively aligned with and spaced from said electrodes; hydraulic turning means operatively connected to said shaft for turning the same in stepwise fashion to successively place the projections of said shaft in positions extending upwardly toward said electrodes, respectively without engaging said electrodes during the turning movement; and hydraulic means cooperating with said shaft for raising and lowering the same in said longitudinal direction after each projection is located in said position thereof, whereby the electrodes will be successively engaged and raised by said projections during the raising of said shaft so that during the lowering of the shaft the electrodes will be jarred by said limiting means to have the dust or the like removed therefrom and whereby said projections will respectively not move relative to the electrode engaged thereby so that friction and wear resulting therefrom is avoided during movement of said electrodes by said projections.

5. In a filter apparatus as recited in claim 4, electrical means cooperating with said hydraulic turning means and said hydraulic raising and lowering means for automatically actuating the latter two means alternately.

6. In a filter apparatus, in combination, a fluid guide for guiding a fluid which carries dust or the like; a plurality of electrodes located in side by side relation and extending into said fluid guide for removing dust or the like from a fluid passing through the fluid guide; means limiting the downward movement of said electrodes while freeing the same for upward movement; a shaft extending beneath said electrodes; a plurality of projections carried by said shaft, respectively distributed about the axis thereof, and respectively aligned with said electrodes; support means supporting said shaft for rotation about its axis as well as for up and down movement, so that when said shaft is moved upwardly an upwardly directed projection will engage an electrode aligned therewith to raise the latter electrode and to lower the latter electrode during subsequent downward movement of said shaft so that dust or the like on the electrode will fall therefrom when said electrode engages said limiting means; raising and lowering means cooperating with said shaft for raising and lowering the same; a stationary pin located adjacent said shaft; and toothed means fixed to said shaft and cooperating with said pin for turning said shaft each time it is lowered through a fraction of a revolution corresponding to the angular distance between a pair of adjacent projections.

7. In a filter apparatus, in combination, a fluid guide for guiding a fluid which carries dust or the like; a plurality of electrodes located in side by side relation and extending into said fluid guide for removing dust or the like from a fluid passing through the fluid guide; means limiting the downward movement of said electrodes while freeing the same for upward movement; a shaft extending beneath said electrodes; a plurality of projections carried by said shaft, respectively distributed about the axis thereof, and respectively aligned with said electrodes; support means supporting said shaft for rotation about its axis as well as for up and down movement, so that when said shaft is moved upwardly an upwardly directed projection will engage an electrode aligned therewith to raise the latter electrode and to lower the latter electrode during subsequent downward movement of said shaft so that dust or the like on the electrode will fall therefrom when said electrode engages said limiting means; and means composed entirely of mechanical elements and cooperating with said shaft for repeatedly moving the same through cycles during each of which said shaft moves up and down and for turning said shaft after each cycle through an angle corresponding to the angular distance between a pair of adjacent projections.

8. A device for moving a shaft up and down as well as for turning the shaft about its axis, said device comprising, in combination, a frame; support means supporting said frame for turning movement about a horizontal axis; a shaft rotatably carried by said frame; a toothed wheel fixed to said shaft; a lever pivotally carried by said frame; a pawl pivotally carried by said lever and cooperating with said toothed wheel for turning the latter together with said shaft when said lever is turned in a predetermined direction; a stop member fixed to said frame and having a downwardly directed face directed toward said lever; a connecting rod pivotally connected at one end to said lever; a crank pivotally connected to the opposite end of said connecting rod, said crank being formed with a cutout composed of a circular portion and an arcuate portion concentric with and arranged along the periphery of said circular portion; a drive shaft parallel to the first-mentioned shaft, having a cross section of the same size as said circular portion of said cutout and extending through the latter portion of said cutout of said crank and being freely turnable with respect to the latter; and a key member fixed to said drive shaft and located in said arcuate portion of said cutout, whereby when said drive shaft is rotated said first-mentioned shaft will be raised and lowered and will be turned through a fraction of a revolution of said drive shaft.

9. In a filter apparatus, a fluid guide for guiding a fluid which carries dust or the like; a plurality of electrodes located in side-by-side relation and extending into said fluid guide for removing dust or the like from a fluid passing through said fluid guide; means limiting the downward movement of said electrodes while freeing the same for upward movement; a shaft extending beneath said electrodes; a plurality of projections carried by said shaft, respectively distributed about the axis thereof and respectively aligned with said electrodes; hydraulic turning means operatively connected to said shaft for turning the same in stepwise fashion to successively place the projections of said shaft in positions extending upwardly toward said electrodes, respectively; hydraulic means cooperating with said shaft for raising and lowering the same after each projection is located in said position, whereby each of the electrodes will be successively raised so that during lowering of the shaft the electrodes will be jarred by said limiting means to have the dust or the like removed therefrom; electrical means cooperating with said hydraulic turning means and said hydraulic raising and lowering means for automatically actuating the latter two means alternately; and valve means cooperating with said two hydraulic means for directing fluid under pressure to one of said hydraulic means and placing the other of said hydraulic means at a low, return-flow pressure when said valve means is in one position and for directing fluid under pressure to said other hydraulic means and placing said one hydraulic means at a low, return-flow pressure when said valve means is in a second position, said electrical means cooperating with said valve means for shifting the same between said positions thereof.

References Cited in the file of this patent

UNITED STATES PATENTS

| | | |
|---|---|---|
| 1,481,970 | Welch | Jan. 29, 1924 |
| 1,588,072 | Weiskopf | June 8, 1926 |
| 2,649,688 | Slomer | Aug. 25, 1953 |
| 2,711,632 | Ellis | June 28, 1955 |

FOREIGN PATENTS

| | | |
|---|---|---|
| 380,023 | Germany | Sept. 3, 1923 |
| 447,137 | Germany | July 18, 1927 |